United States Patent [19]

Matsunaga

[11] Patent Number: 5,128,759
[45] Date of Patent: Jul. 7, 1992

[54] VIDEO SIGNAL DECODER
[75] Inventor: Osamu Matsunaga, Kanagawa, Japan
[73] Assignee: Sony Corporation, Tokyo, Japan
[21] Appl. No.: 707,820
[22] Filed: May 30, 1991
[30] Foreign Application Priority Data
  May 31, 1990 [JP] Japan .................................. 2-42533
[51] Int. Cl.⁵ ...................... H04N 7/12; H04N 7/00; H04N 7/13
[52] U.S. Cl. .................................. 358/135; 358/136; 358/138
[58] Field of Search ............... 358/133, 136, 138, 135, 358/141, 142, 11, 12, 13, 167, 105

[56] References Cited
U.S. PATENT DOCUMENTS

| | | | |
|---|---|---|---|
| 4,785,351 | 11/1988 | Ishikawa | 358/136 |
| 4,868,654 | 9/1989 | Juri et al. | 358/13 |
| 4,979,037 | 12/1990 | Mizutani et al. | 358/136 |
| 4,979,040 | 12/1990 | Masumoto | 358/138 |
| 5,018,010 | 5/1991 | Masumoto | 358/136 |

Primary Examiner—James J. Groody
Assistant Examiner—Michael H. Lee
Attorney, Agent, or Firm—Lewis H. Eslinger; Jay H. Maioli

[57] ABSTRACT

A MUSE-format video signal decoder comprising a first frame memory supplied with an input digital video signal and having a delay time of 1-frame period; a 1-frame difference detector including a first interpolation filter supplied with the input digital video signal, a second interpolation filter supplied with the digital video signal from the first frame memory, a first subtracter for obtaining the difference between the outputs of the first filter and the first frame memory, and a second subtracter for obtaining the difference between the input digital video signal and the output of the second filter, wherein a 1-frame difference signal is produced in accordance with the outputs of the first and second subtracters; and a 2-frame difference detector including first and second bit compressors supplied with the outputs of the first and second subtracters respectively, a second frame memory having a delay time of 1-frame period and supplied with outputs of the first and second bit compressors, and an adder for obtaining the sum of the other outputs of the first and second bit compressors and the output of the second frame memory, wherein a 2-frame difference signal is produced in accordance with the output of the adder. Due to such constitution, the capacity of each frame memory can be reduced.

5 Claims, 11 Drawing Sheets

| FIG.9(a) | FIG.9(b) |

FIG.9(b)

(PIXEL DATA OF PRESENT FRAME) − (PIXEL DATA OF PRECEDING FRAME)

(PIXEL DATA OF PRESENT FRAME) − (PIXEL DATA OF PRECEDING FRAME)

(PIXEL DATA OF ANTE-PRECEDING FRAME) − (PIXEL DATA OF PRECEDING FRAME)

(INTERPOLATED PIXEL DATA OF PRECEDING FRAME) − (PIXEL DATA OF ANTE-PRECEDING FRAME)

(PIXEL DATA OF PRESENT FRAME) − (INTERPOLATED PIXEL DATA OF PRECEDING FRAME)

(INTERPOLATED PIXEL DATA OF PRESENT FRAME) − (PIXEL DATA OF PRECEDING FRAME)

(PIXEL DATA OF PRESENT FRAME) − (PIXEL DATA OF ANTE-PRECEDING FRAME)

VIDEO SIGNAL DECODER

BACKGROUND OF THE INVENTION

1. Field of the Invention

The present invention relates to a video signal decoder based on the MUSE (Multiple Sub-nyquist Sampling Encoding) system where the capacity of each frame memory employed therein can be reduced.

2. Description of the Prior Art

Figure 4:
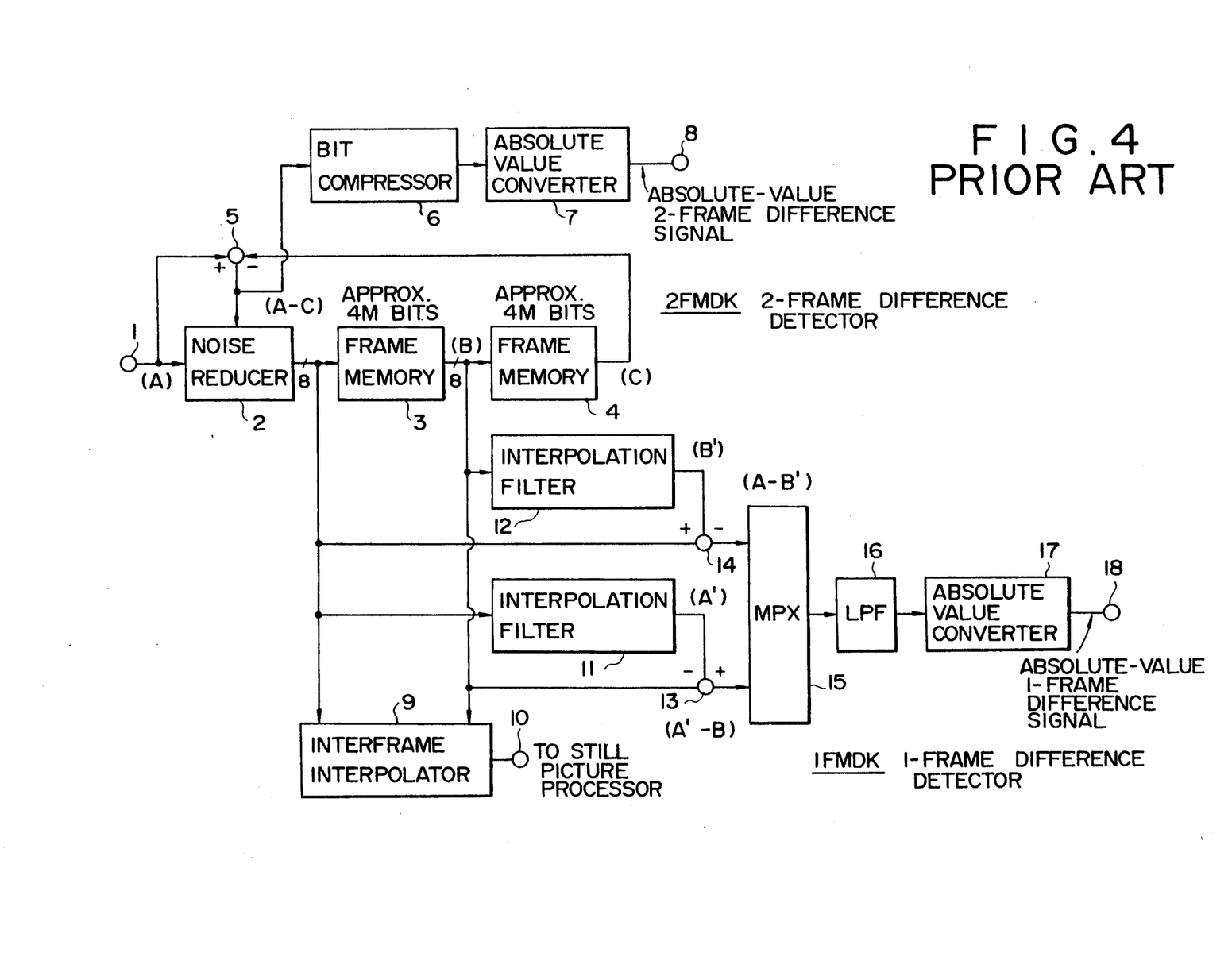
FIG. 4 is a block diagram of a conventional example (1)

Referring first to FIG. 4, a description will be given on a conventional example (1) of a MUSE-format video signal decoder which employs two frame memories each having a delay time of 1-frame period. A parallel 8-bit digital video signal (digital luminance signal) (A) obtained from an input terminal 1 by three-dimensional subsampling is supplied via a noise reducer 2 to a first frame memory 3, and a digital video signal (B) outputted therefrom is supplied to a second frame memory 4.

Figure 5:
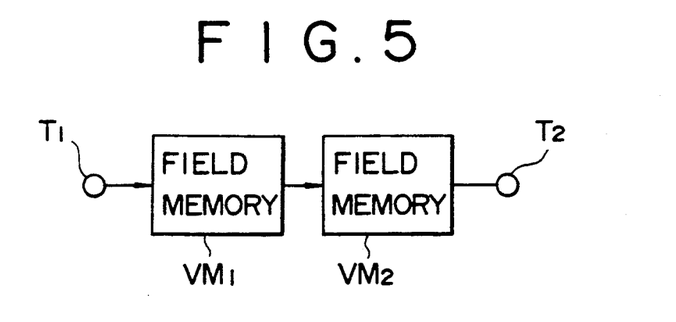
FIG. 5 is a block diagram showing the structure of a frame memory employed in the example of FIG. 4.

As shown in FIG. 5, each of the first and second frame memories 3 and 4 is composed of field memories VM1 and VM2 which are cascade-connected between input and output terminals T1 and T2. Each frame memory as a whole has a capacity of $1125 \times 480 \times 8 = 4,320,000$ bits (i.e., approx. 4M bits) and a delay time of 2-field periods (i.e., 1-frame period).

Figures 9, 9A:
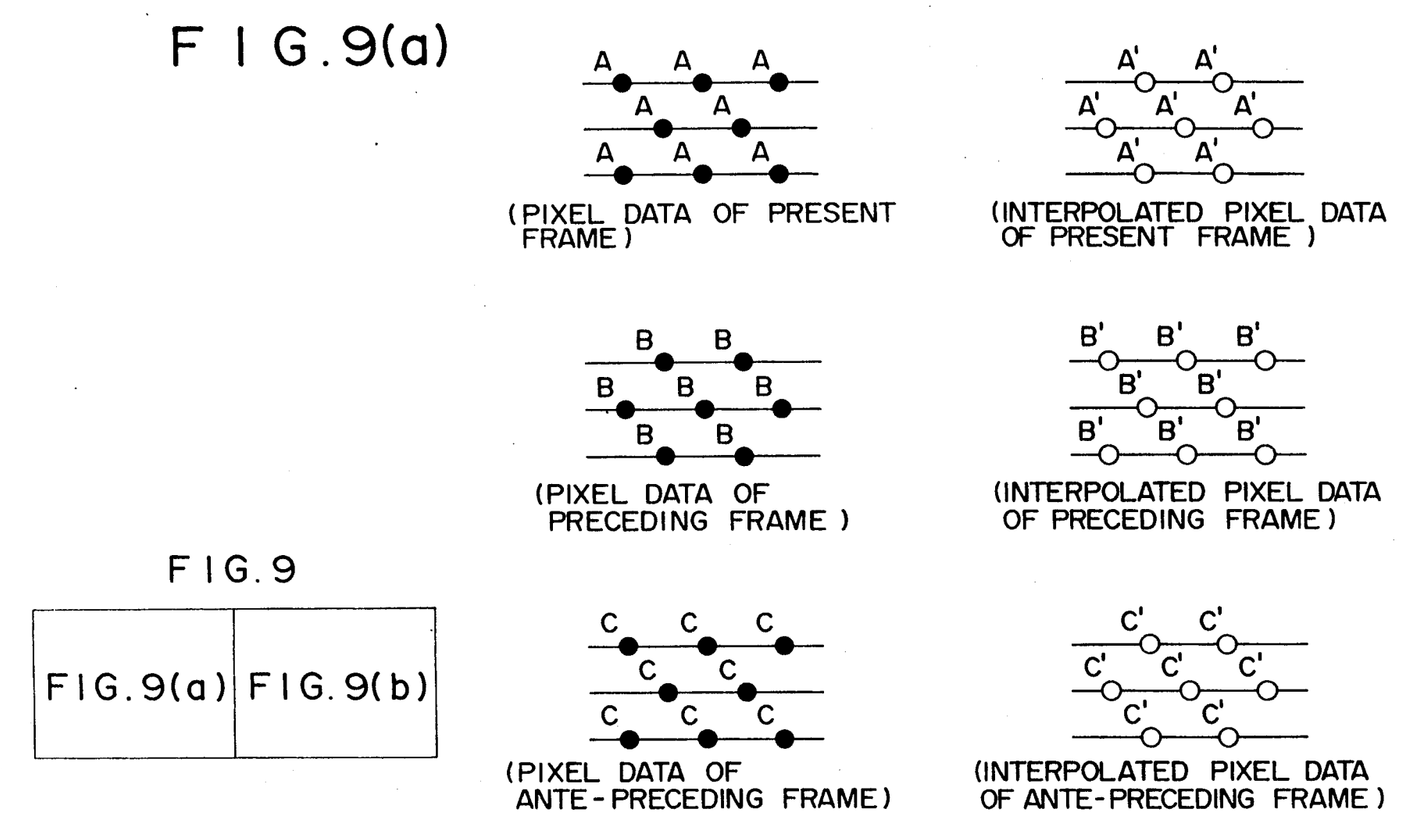
Figure 9B:
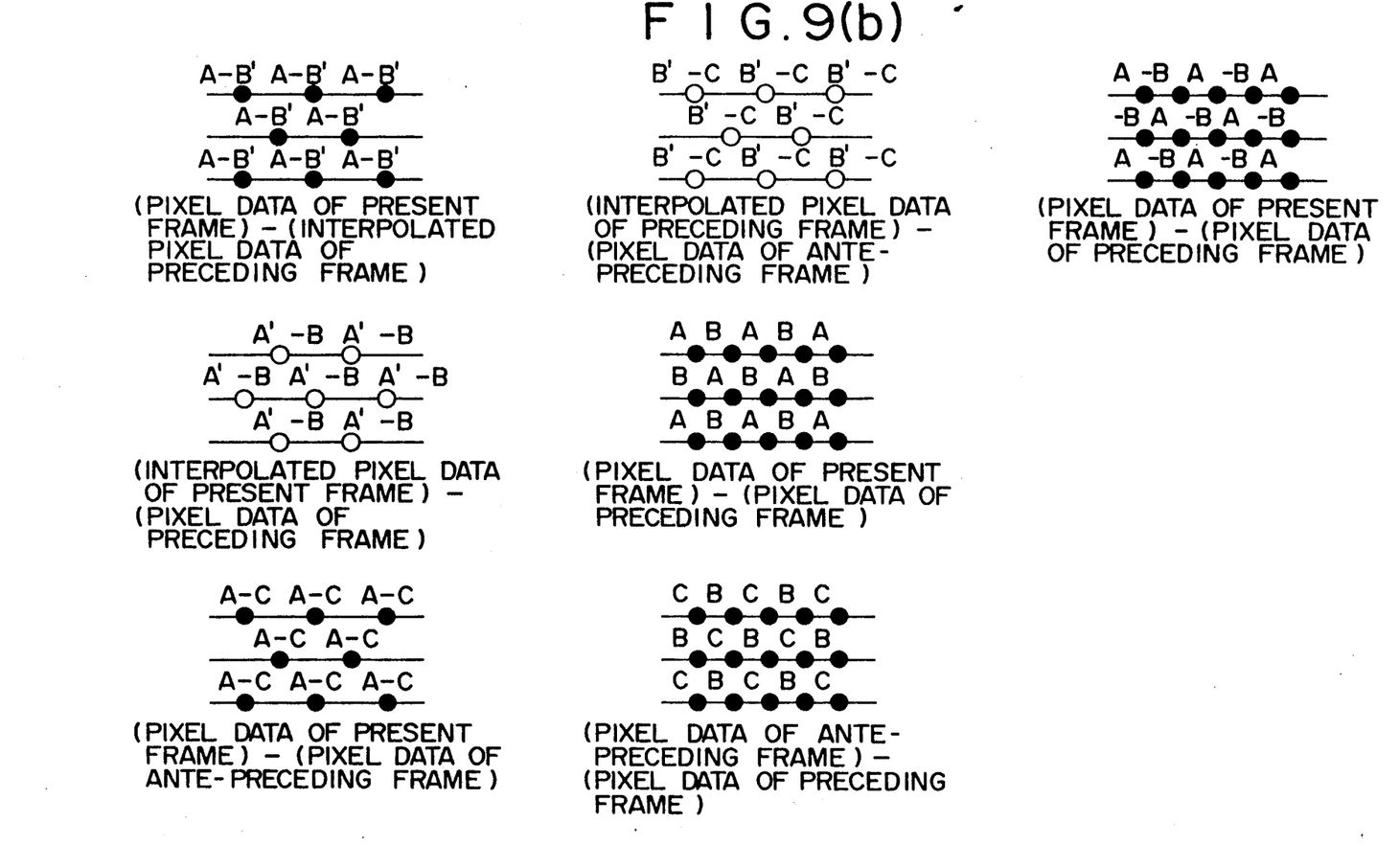

Subsequently, in a subtracter 5, the digital video signal (C) outputted from the frame memory 4 is subtracted from the digital video signal (A) obtained from the input terminal 1, and the resultant difference digital video signal (A - C) is supplied via a bit compressor 6 to an absolute value converter 7. (The pixel data arrangement thereof is shown in FIGS. 9(a).) Thus, an absolute-value 2-frame difference signal is obtained at an output terminal 8 of a 2-frame difference detector 2FMDK.

Figure 6:
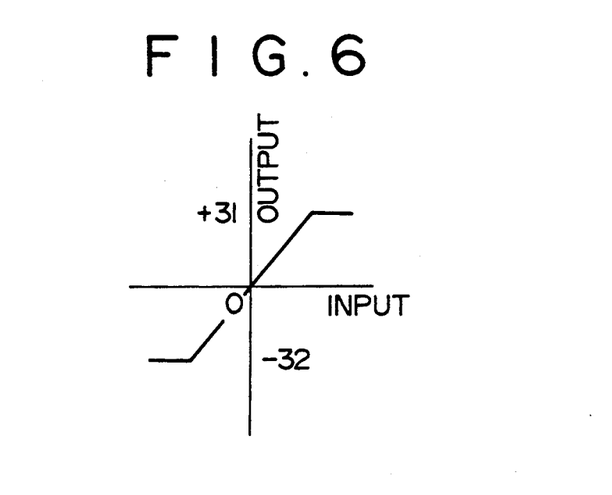
FIG. 6 graphically shows the characteristic of bit compression.

The bit compressor 6 is a circuit where an 8-bit difference digital video signal of $-128-0-+127$ levels is compressed to a 6-bit difference digital video signal of $-32-0-+31$ levels, as shown in FIG. 6.

The digital video signals (A), (B) and (C) represent the pixel data of the present frame, the preceding frame and the ante-preceding frame, respectively. The arrangement relationship of the pixel data on mutually corresponding scanning lines in the same odd or even field is such that, as shown in FIG. 9(a) the pixel data B is positioned between the pixel data A, and the pixel data C is positioned between the pixel data B.

The difference digital video signal (A - C) outputted from the subtracter 5 is supplied to the noise reducer 2.

The digital video signal (A) obtained from the noise reducer 2 and the digital video signal (B) from the first frame memory 3 are supplied to an interframe interpolator 9, whose output is then supplied via an output terminal 10 to an unshown still picture processor in the MUSE-format video signal decoder.

Now a 1-frame difference detector 1FMDK will be described below.

The digital video signal (A) from the noise reducer 2 is supplied to a first interpolation filter 11, while the digital video signal (B) from the first frame memory 3 is supplied to a second interpolation filter 12. In a first subtracter 13, the digital video signal (B) from the first frame memory 3 is subtracted from the interpolated digital signal (A') obtained from the first interpolation filter 11, thereby producing a first difference digital video signal (A'-B). (The pixel data arrangement thereof is shown in FIG. 9.) In a second subtracter 14, the interpolated digital video (B') obtained from the interpolation filter 12 is subtracted from the digital video signal (A) to produce a second difference digital video signal (A - B'). (The pixel data arrangement thereof is shown in FIG. 9.) The first and second difference digital video signals (A'-B) and (A - B') are supplied to a multiplexer 15, where the input signals are combined with each other. And the output therefrom is supplied via a low-pass filter 16 of a cutoff frequency 4 MHz to an absolute value converter 17 so as to be converted into an absolute value, whereby an absolute-value 1-frame difference signal is obtained from an output terminal 18.

Figure 7:
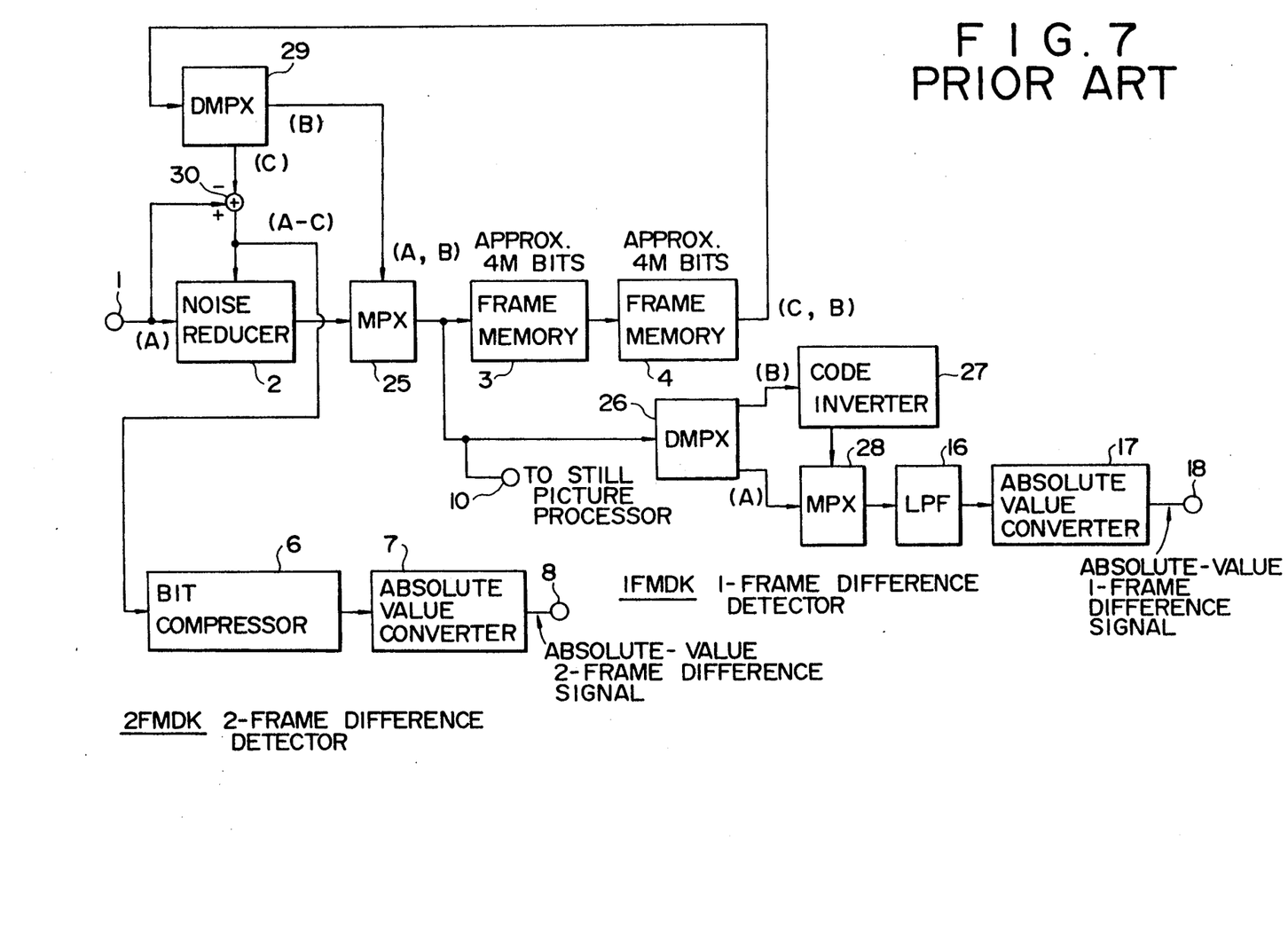
FIG. 7 is a block diagram of another conventional example (2)

Referring next to FIG. 7, a description will be given with regard to another conventional MUSE-format video signal decoder (2) which employs two frame memories each having a delay time of 1-field period. In FIG. 7, the same reference numerals and symbols as those used in FIG. 4 denote the same or corresponding components, and a repeated explanation thereof is omitted here. A parallel 8-bit digital video signal (A) obtained from an input terminal 1 by three-dimensional subsampling is supplied via a noise reducer 2 to a multiplexer 25. The digital video signal (A, B) outputted from the multiplexer 25 is supplied to a first frame memory 3, whose output is then supplied to a second frame memory 4. (The pixel data arrangement thereof is shown in FIG. 9.) The digital video signal (C, B) outputted from the second frame memory 4 is supplied to a demultiplexer 29, where the input signal is separated into the digital video signals (B) and (C). (The pixel data arrangement of the signal (C, B) is shown in FIG. 9.)

Figure 8:
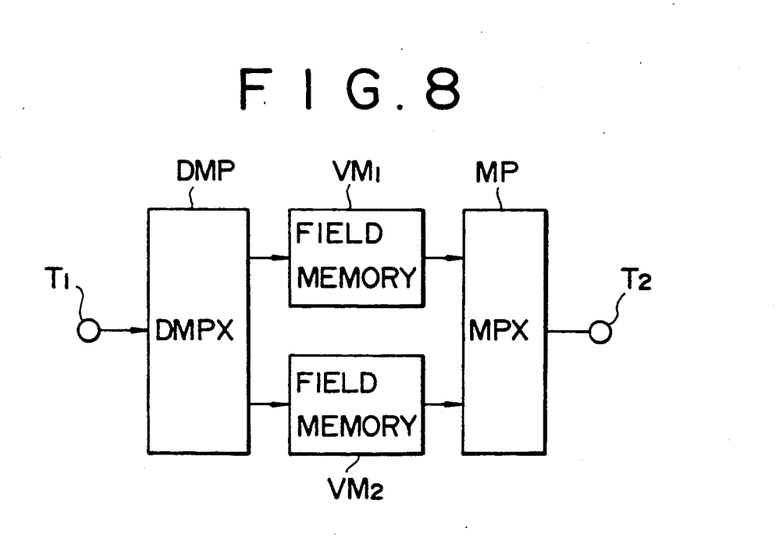
FIG. 8 is a block diagram showing the structure of a frame memory employed in the example of FIG. 7.

As shown in FIG. 8, each of the first and second frame memories 3 and 4 comprises a demultiplexer DMP connected to an input terminal T1, field memories VM1, VM2 supplied with two outputs of the demultiplexer DMP, and a multiplexer MPX supplied with outputs of the field memories and connected to an output terminal T2. Each of the frame memories has a total capacity of $1125 \times 480 \times 8 = 4,320,000$ bits (i.e., approx. 4M bits) and a delay time of 1-field period.

Now the constitution of a 2-frame difference detector 2FMDK will be described below. The digital video signal (B) obtained from the demultiplexer 29 is supplied to the multiplexer 25 and then is combined with the digital video signal (A) outputted from the noise reducer 2. In a subtracter 30, the digital video signal (C) outputted from the demultiplexer 29 is subtracted from the digital video signal (A), and a difference digital video signal (A - C) thus obtained is supplied to the noise reducer 2 while being supplied also to a bit compressor 6 which is similar to the aforementioned bit compressor 6 shown in FIG. 4, whereby bit compression is executed. The bit-compressed signal is then supplied to an absolute value converter 7, so that an absolute value 2-frame difference signal is obtained from an output terminal 8.

Next the constitution of a 1-frame difference detector 1FMDK will be described below. The output digital video signal (A, B) of the multiplexer 25 is supplied via the output terminal 10 to the still picture processor while being supplied also to a demultiplexer 26 so as to be separated into the digital video signals (A) and (B). Subsequently the digital video signal (A) and the digital video signal (−B) obtained through phase inversion by a code inverter 27 are supplied to a multiplexer 28 so as to be combined with each other. The combined digital video signal (A, −B) is then supplied via a low-pass filter 16 to an absolute value converter 17, so that an absolute-value 1-frame difference signal is obtained from an output terminal 18.

In each of the conventional examples (1) and (2), there are needed two frame memories 3 and 4 each having a capacity of 4M bits or so.

OBJECT AND SUMMARY OF THE INVENTION

It is therefore an object of the present invention to provide an improved MUSE-format video signal decoder where the capacity of each frame memory employed therein can be reduced as compared with any known example.

According to one aspect of the present invention, there is provided a MUSE-format video signal decoder comprising a first frame memory supplied with an input digital video signal and having a delay time of 1-frame period; a 1-frame difference detector including a first interpolation filter supplied with the input digital video signal, a second interpolation filter supplied with the digital video signal from the first frame memory, a first subtracter for obtaining the difference between the output of the first interpolation filter and the digital video signal outputted from the first grame memory, and a second subtracter for obtaining the difference between the input digital video signal and the output of the second interpolation filter, wherein a 1-frame difference signal is produced in accordance with the outputs of the first and second subtracters; and a 2-frame difference detector including first and second bit compressors supplied with the outputs of the first and second subtracters respectively, a second frame memory having a delay time of 1-frame period and supplied with one output of the first bit compressor and that of the second bit compressor, and an adder for obtaining the sum of the other outputs of the first and second bit compressors and the output of the second frame memory, wherein a 2-frame difference signal is produced in accordance with the output of the adder.

According to another object of the present invention, there is provided a MUSE-format video signal decoder comprising a 1-frame difference detector including a first interpolation filter supplied with a first digital video signal, a second interpolation filter supplied with a second digital video signal as an input digital video signal, a first subtracter for obtaining the difference between the output of the first interpolation filter and the second digital video signal, a second subtracter for obtaining the difference between the first digital video signal and the output of the second interpolation filter, and first and second bit compressors supplied with the outputs of the first and second subtracters respectively, wherein a 1-frame difference signal is produced in accordance with the outputs of the first and second bit compressors; and a 2-frame difference detector including a 2-frame memory having a delay time of 2-frame period and supplied with one output of the first bit compressor and that of the second bit compressor, and an adder for obtaining the sum of the second digital video signal outputted from the 2-frame memory and the other outputs of the first and second bit compressors, wherein a 2-frame difference signal is produced in accordance with the output of the adder.

The above and other features and advantages of the present invention will become apparent from the following description which will be given with reference to the illustrative accompanying drawings.

BRIEF DESCRIPTION OF THE DRAWINGS

FIG. 1, consisting of FIGS. 1(a) and 1 (b);

FIG. 2, consisting of FIGS. 2(a) and 2 (b); and

FIG. 3, consisting of FIGS. 3(a) and 3 (b), exemplary embodiments (1), (2) and (3) of the present invention, respectively;

FIG. 9 consisting of FIGS. 9(a) and 9(b) illustrates arrangements of pixel data.

DESCRIPTION OF THE PREFERRED EMBODIMENTS

Figures 1, 1B:
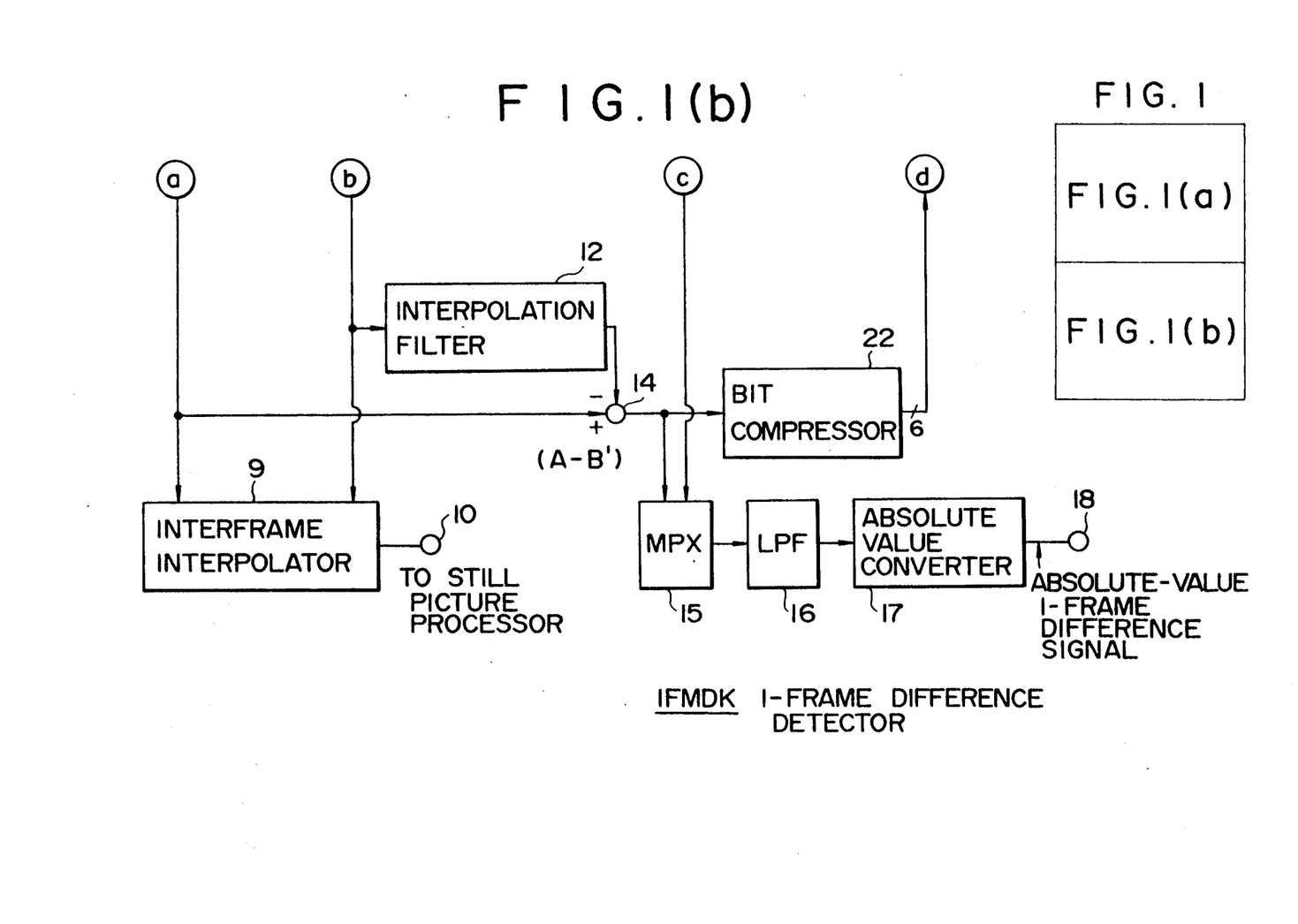
Figure 1A:
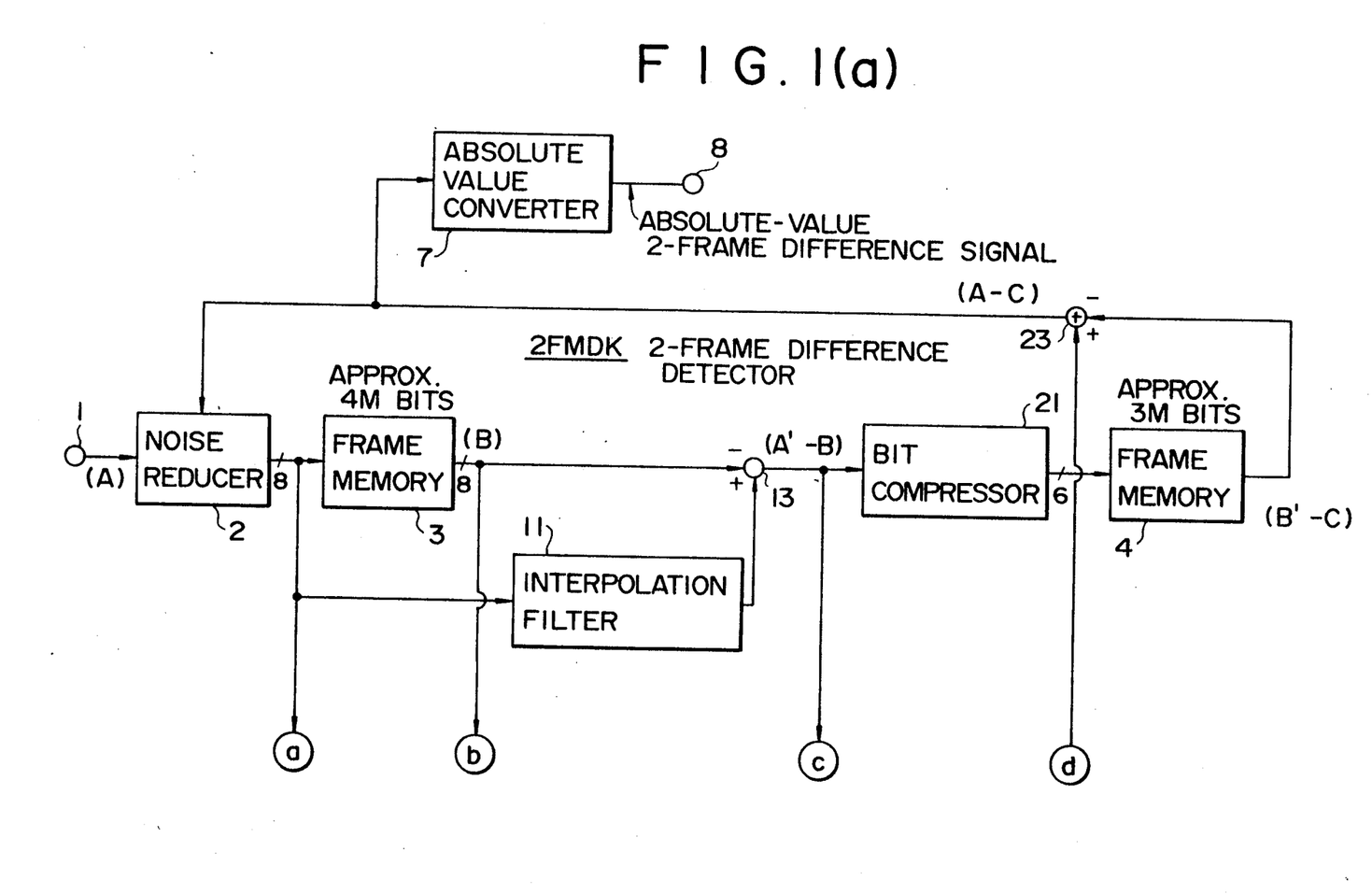

Hereinafter an exemplary embodiment (1) of the present invention will be described in detail with reference to FIG. 1. In the embodiment (1) which is an improvement of the conventional example (1) shown in FIG. 4, each of first and second frame memories 3, 4 has the aforementioned structure of FIG. 5. In FIG. 1, the same reference numerals and symbols as those used in FIG. 4 denote the same or corresponding components, and a repeated explanation thereof is omitted here.

First a description will be given of a 2-frame difference detector 2FMDK which is different in constitution from the one employed in the conventional example. More specifically, difference digital video signals (A'-B) and (A - B;) outputted from first and second subtracters 13, 14 are supplied to bit compressors 21, 22 which are similar to the known ones described with reference to FIG. 6, so that such signals are compressed to parallel 6-bit difference digital signals (A'- B) and (A - B'), which are then supplied respectively to a second frame memory 4 and an adder 23. In the meantime, a difference digital video signal (B'- C) from the frame memory 4 is supplied also to the adder 23. In the adder 23, the compressed difference digital video signal (B'- C) outputted from the frame memory 4 is added to the compressed difference digital video signal (A - B') outputted from the bit compressor 22, to thereby obtain a compressed difference digital video signal (A - C). This signal is supplied to a noise reducer 2 while being also supplied to an absolute value converter 7 so as to be converted into an absolute value, whereby an absolute-value 2 frame difference signal is obtained at an output terminal 8.

Since the 2-frame difference detector 2FMDK is so constituted as mentioned, it becomes possible to reduce the capacity of the second frame memory 4 to 1125×480 ×6=3,240,000 bits (i.e., approx. 3M bits). Meanwhile the capacity of the first frame memory 3 is equal to that of the conventional example.

Figures 2, 2B:
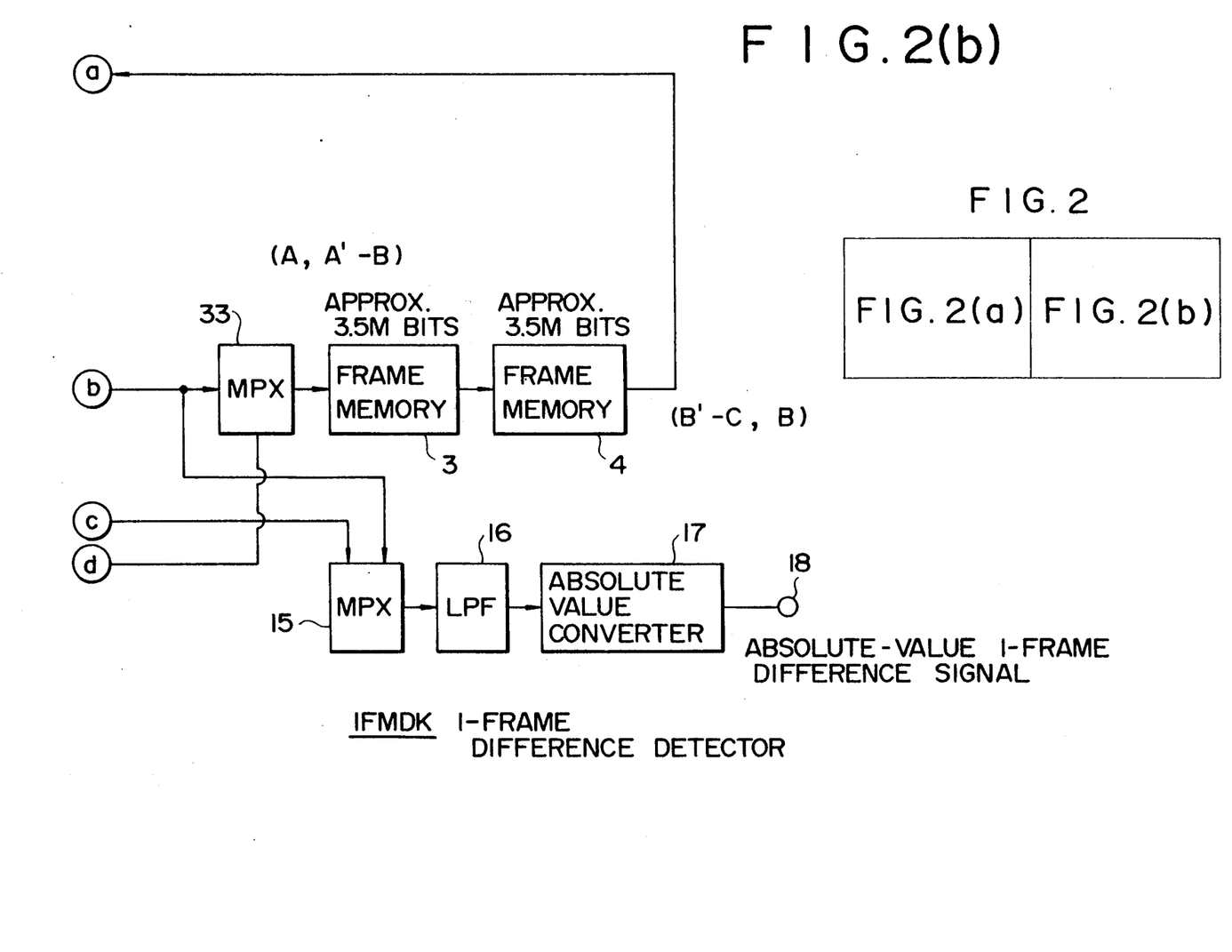
Figure 2A:
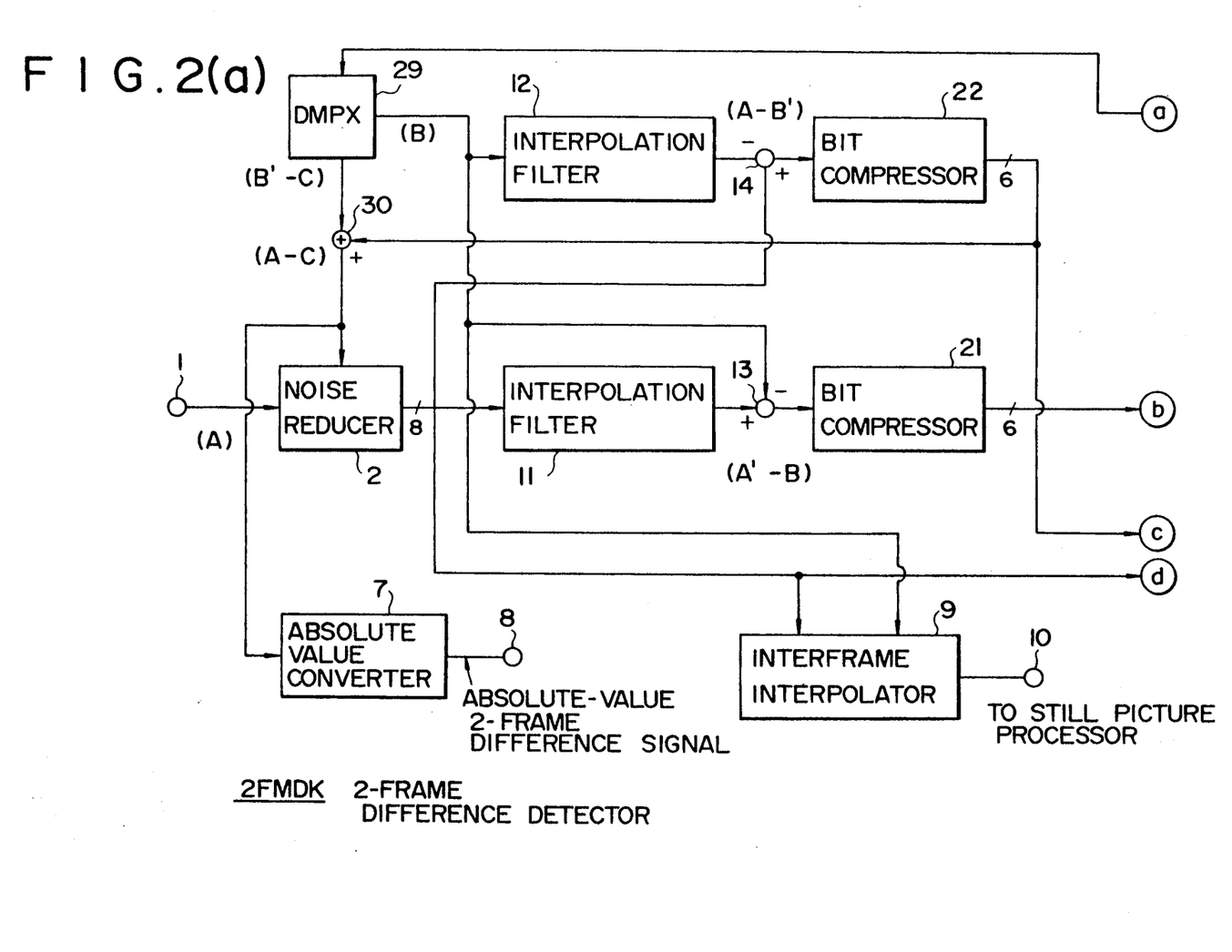

Referring next to FIG. 2, an exemplary embodiment (2) of the present invention will be described below. In the embodiment (2) which is an improvement of the conventional example (2) shown in FIG. 7, each of first and second frame memories 3, 4 have the aforementioned structure of FIG. 8. In FIG. 2, the same reference numerals and symbols as those used in FIG. 7 denote the same or corresponding components, and a repeated explanation thereof is omitted here.

A digital video signal (B) outputted from a demultiplexer 29 serves as a second digital video signal, and an input digital video signal (A) from a noise reducer 2 serves as a first digital video signal. The second digital video signal (B) is supplied to a first interpolation filter 12, while the first digital video signal (A) is supplied to a first interpolation filter 11. In a second subtracter 14, the (B') of the first interpolation filter 12 is subtracted from the first digital video signal (A). And in a first subtracter 13, the second digital video (B) is subtracted from the (A') of the first interpolation filter 11. Subsequently the second and first difference digital video signals (A - B') and (A'- B) outputted from the second and first subtracters 14, 13 are supplied respectively to second and first bit compressors 22, 21 which are similar to those mentioned with reference to FIG. 4, whereby bit compression is executed.

The 1-frame difference detector 1FMDK is constituted as follows. The outputs of the bit compressors 21, 22 are supplied to a multiplexer 15 so as to be combined with each other, and then the combined output therefrom is supplied via a low-pass filter 16 to an absolute value converter 17, so that an absolute-value 1-frame difference signal is obtained from an output terminal 18.

Next the constitution of the 2-frame difference detector 2FMDK will be described below. The first digital video signal (input digital video signal) obtained from the noise reducer 2 and the output of the first bit compressor 21 are supplied to a multiplexer 33 so as to be combined with each other, and the combined digital video signal (A, A'- B) outputted therefrom is supplied to a cascade-connected circuit of the first and second frame memories 3, 4 to thereby obtain a digital video signal (B'- C, B), which is then supplied to a demultiplexer 29 so as to be separated into the digital video signals (B) and (B'- C). The digital video signal (B) thus separated is the aforementioned first digital video signal. In an adder 30, the compressed difference digital video signal (A - B') from the second bit compressor 22 is added to the difference digital video signal (B'- C) separated by the demultiplexer 29, so that a difference digital video signal (A - C) is obtained. This signal is supplied to the noise reducer 2 while being supplied also to the absolute value converter 7 so as to be converted into an absolute value, whereby an absolute-value 2-frame difference signal is obtained at an output terminal 8.

Due to such constitution of the 2-frame difference detector 2FMDK, it becomes possible to reduce the capacity of each of the first and second frame memories 3, 4 to
$(2 \times 1125 \times 480 \times 8 - 1125 \times 480 \times 2) \div 2 = (1125 \times 480)(2 \times 8 - 2) \div 2 = 3,780,000$ bits (i.e., approx. 3.5M bits).

Now a description will be given of another embodiment (3) of the present invention with reference to FIG. 3. Since the embodiment (3) of FIG. 3 is mostly similar to the aforementioned embodiment (1) of FIG. 1, any components corresponding to those used in the embodiment (1) of FIG. 1 are denoted by the same reference numerals or symbols, and a repeated explanation thereof is omitted here.

The aforementioned embodiment (1) of FIG. 1 represents an exemplary case where the frame memory 4 employed therein has a capacity of approximately 3M bits. However, in the embodiment (3) of FIG. 3, the frame memory 4 has a capacity of approximately 4M bits, and the entire capacity is used in a freeze mode or a still-picture broadcast receiving mode.

Figures 3, 3B:
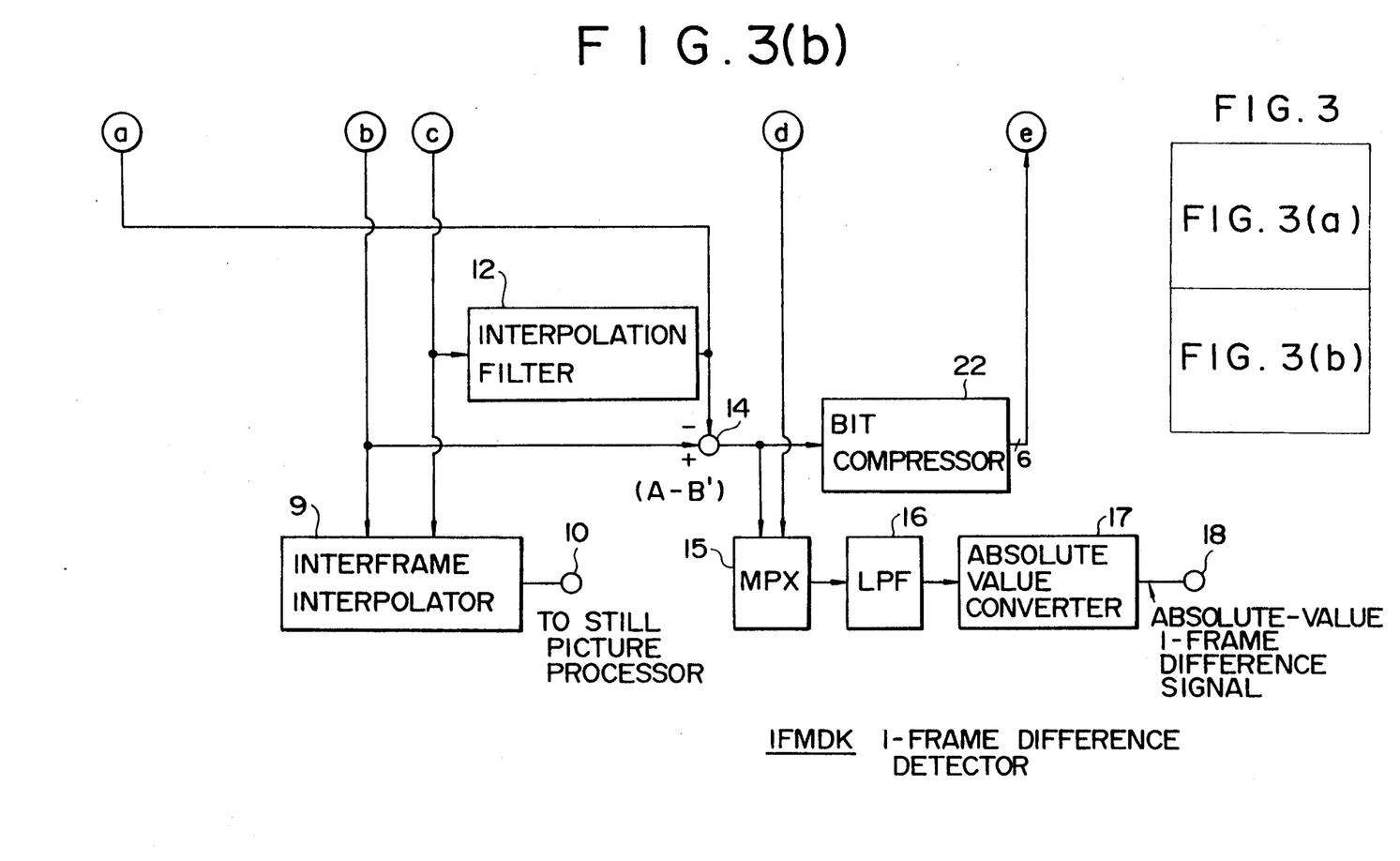
Figure 3A:
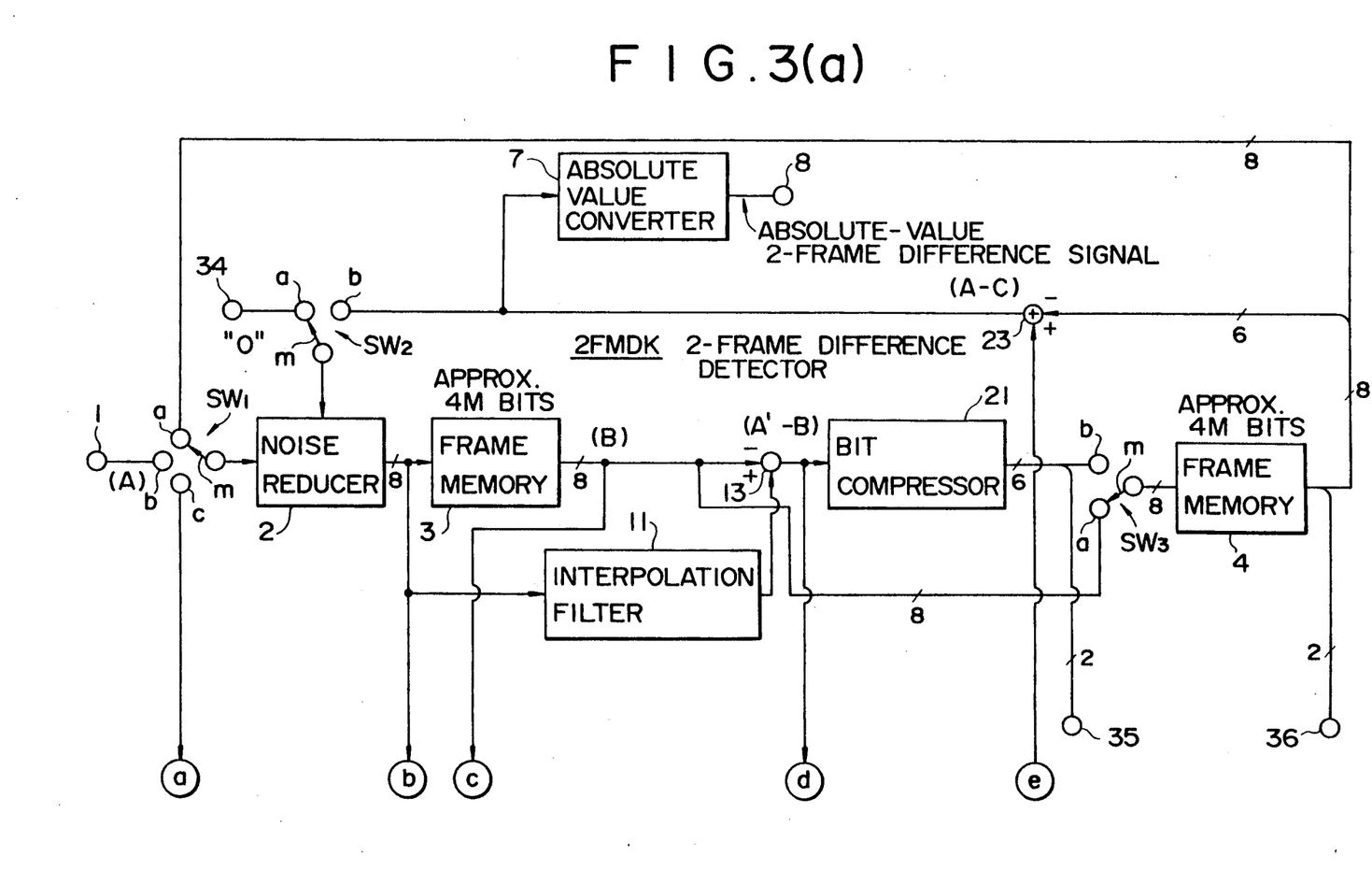

In the example of FIG. 3, three selector switches SW1, SW2 and SW3 are provided. The selector switch SW1 has a movable contact m and stationary contacts a, b, c; and each of the selector switches SW2 and SW3 has a movable contact m and stationary contacts a, b. The movable contact m is selectively changeable to the stationary contacts a, b, c or the stationary contacts a, b in a manner described below.

Switch SW1

Stationary contact a: In freeze mode; after complete storage of 4 fields of digital video signal in first and second frame memories 3, 4
Stationary contact b: In normal mode
Stationary contact c: Upon occurrence of dropout

Switch SW2

Stationary contact a: In freeze mode
Stationary contact b: In normal mode

Switch SW3

Stationary contact a: In freeze mode
Stationary contact b: In normal mode

In the switch SW1: the movable contact m is connected to one input of the noise reducer 2; the stationary contact a is connected to the output of the second frame memory 4; the stationary contact b to the input terminal 1; and the stationary contact c to the output of the second interpolation filter 12.

In the switch SW2: the movable contact m is connected to the other input of the noise reducer 2; the stationary contact a to the input terminal 34 to which "0" is inputted continuously; and the stationary contact b to the output of the adder 23.

And in the switch SW3: the movable contact m is connected to the input of the second frame memory 4; the stationary contact a to the output of the first frame memory 3; and the stationary contact b to the output of the first bit compressor 21.

A 2-bit signal from an input terminal 35 is additionally fed to the stationary contact b of the switch SW3 and, after a delay of 1-frame period, the 2-bit signal is supplied from the second memory 4 to an output terminal 36. Such input terminal 35 and output terminal 36 are used for the signal processing by a motion detector.

Now a description will be given of the operation of the decoder in the embodiment (3) of FIG. 3. In a normal mode, the respective movable contacts m of the three switches SW1, SW2 and SW3 are connected to the stationary contacts b to thereby form the circuit configuration shown in the embodiment (1) of FIG. 1.

In a freeze mode, first the movable contacts m of the switches SW2 and SW3 are changed from the stationary contacts b to the stationary contacts a. However, the movable contact m of the switch SW1 is still left connected to the stationary contact b. And upon complete storage of a 4-field or 2-frame digital video signal in the first and second frame memories 3 and 4, the movable contact m of the switch SW1 is changed from the stationary contact b to the stationary contact a. In this stage of the operation, the absolute-value 2-frame difference signal obtained from the output terminal 8 is not utilized or detected since it is insignificant.

In response to occurrence of a dropout (during reproduction of MUSE-format signal from a recording medium), the movable contact m of the switch SW1 is changed from the stationary contact b to the stationary contact c, so that the interpolated digital video signal of the preceding frame is inputted to the noise reducer 2. In such a case, it has been customary heretofore to use the digital video signal of the ante-preceding frame upon occurrence of a dropout.

According to the present invention, as described above, it becomes possible to reduce the capacity of each frame memory employed in a MUSE format video signal decoder where a 1-frame difference signal and a 2-frame difference signal are obtained.

What is claimed is:

1. A video signal decoder comprising:
a first frame memory supplied with an output digital video signal and having a delay time of 1-frame period;
a 1-frame difference detector including a first interpolation filter supplied with the input digital video signal, a second interpolation filter supplied with the digital video signal from said first frame memory, a first subtractor for obtaining the difference between the output of said first interpolation filter and the digital video signal outputted from said first frame memory, and a second subtracter for obtaining the difference between the input digital video signal and the output of said second interpolation filter, wherein the 1-frame difference signal is produced in accordance with the outputs of said first and second subtracters; and
a 2-frame difference detector including first and second bit compressors supplied with the outputs of said first and second subtracters respectively, a second frame memory having a delay time of 1-frame period and supplied with the output of one of said first and second bit compressors, and an adder for obtaining the sum of the output of the other of said first and second bit compressors and the output of said second frame memory, wherein a 2-frame difference signal is produced in accordance with the output of said adder.

2. A video signal decoder comprising:
a 1-frame difference detector including a first interpolation filter supplied with a first digital video signal, a second interpolation filter supplied with a second digital video signal as an input digital video signal, a first subtracter for obtaining the difference between the output and said first interpolation filter and the second digital video signal, a second subtracter for obtaining the difference between the first digital video signal and the output of said second interpolation filter, and first and second bit compressors supplied with the outputs of said first and second subtracters respectively, wherein a 1-frame difference signal is produced in accordance with the outputs of said first and second bit compressors; and
a 2-frame difference detector including a 2-frame memory having a delay time of 2-frame period and supplied with the output of one of said first and second bit compressors, and an adder for obtaining the sum of a demultiplexed output of said 2-frame memory and the output of the other of said first and second bit compressors, wherein a 2-frame difference signal is produced in accordance with the output of said adder.

3. A video signal decoder according to claim 1, wherein the output of said second frame memory is used to control a noise reduction circuit for the input digital video signal.

4. A video signal decoder according to claim 2, wherein the output of said 2-fame memory is used to control a noise reduction circuit for the input digital signal.

5. A video signal decoder according to claim 1, 2, 3 or 4, wherein the input video signal to be processed is based on the MUSE format.

* * * * *